United States Patent [19]

Smagner

[11] Patent Number: 4,505,064
[45] Date of Patent: Mar. 19, 1985

[54] TRAP BOOT

[76] Inventor: John D. Smagner, 109 South Ave., Watkins, N.Y. 14891

[21] Appl. No.: 464,688

[22] Filed: Feb. 7, 1983

[51] Int. Cl.³ .......................................... A10M 23/26
[52] U.S. Cl. ........................................ 43/96; 43/58
[58] Field of Search .................... 43/96, 58, 63, 88, 93

[56] References Cited

U.S. PATENT DOCUMENTS

| 621,643 | 3/1899 | Evans | 43/96 |
|---|---|---|---|
| 1,191,909 | 7/1916 | Phillips | 43/88 |
| 1,246,782 | 11/1917 | Partello | 43/93 |
| 1,421,610 | 7/1922 | Svehla | 43/88 |
| 1,464,399 | 8/1923 | Allison | 43/92 |
| 1,889,351 | 11/1932 | Cooper | 43/63 |
| 1,961,075 | 5/1934 | McMullen | 43/88 |
| 1,997,932 | 4/1935 | Houts | 43/96 |
| 2,506,834 | 5/1950 | Hurthig | 43/93 |
| 4,272,907 | 6/1981 | Skapura | 43/96 |
| 4,424,640 | 1/1984 | Cook | 43/58 |

FOREIGN PATENT DOCUMENTS

| 121811 | 7/1946 | Australia | 43/96 |
|---|---|---|---|
| 327196 | 10/1920 | Fed. Rep. of Germany | 43/96 |
| 133786 | 4/1919 | United Kingdom | 43/96 |

Primary Examiner—Nicholas P. Godici
Assistant Examiner—Kurt Rowan

[57] ABSTRACT

This invention relates to a boot for jaw traps. The resilient floor section of the boot extends beneath substantially the entire trap. The floor of the boot has a surface that conforms to the various trap parts such as the frame and cross member and has indentations which receive the coiled springs. Outwardly projecting sections of the boot extend beneath the spring levers and provide support therefor. A trap set in the boot is extremely stable and is capable of springing upwardly to an extent greater than if it were directly in contact with the ground.

7 Claims, 3 Drawing Figures

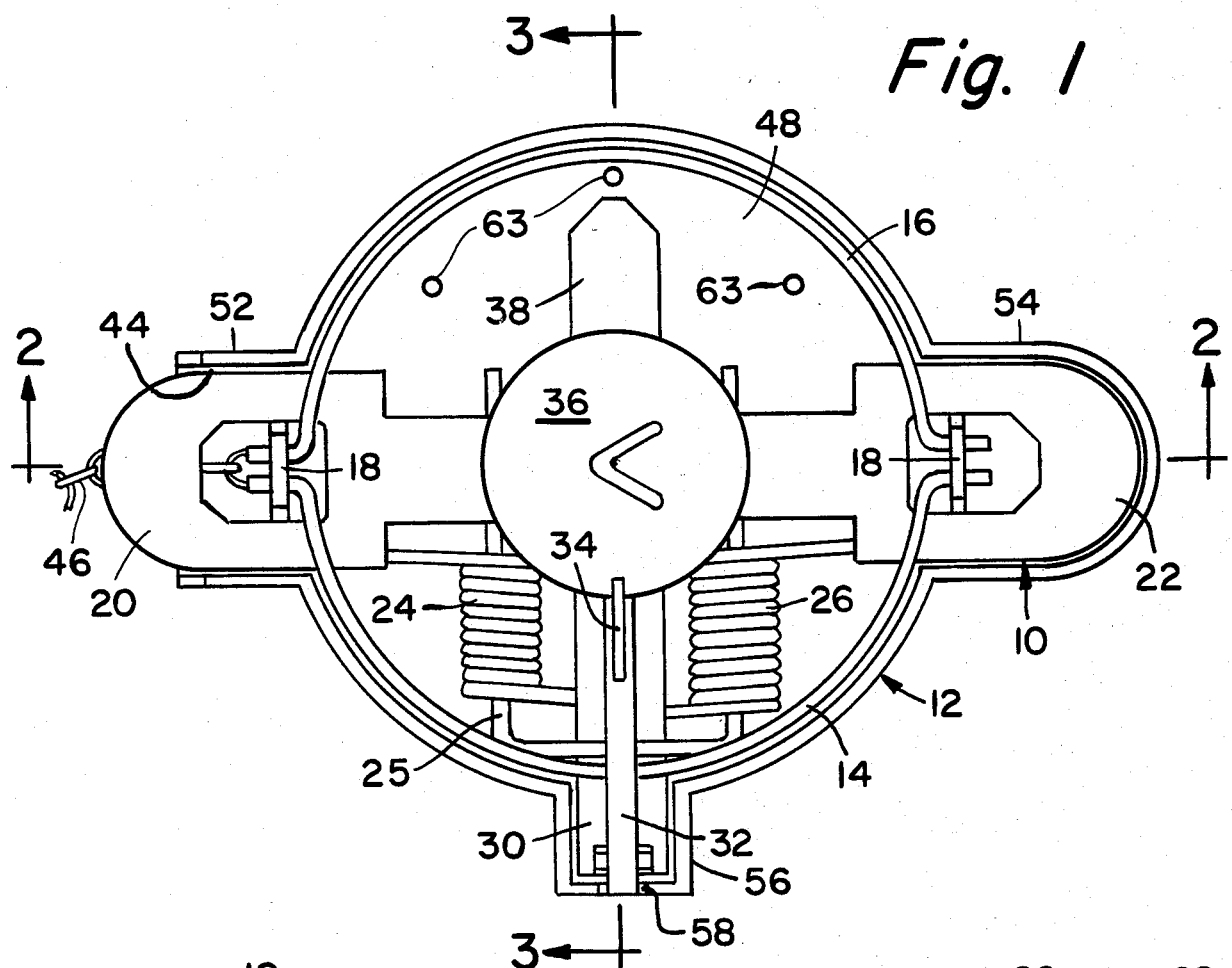
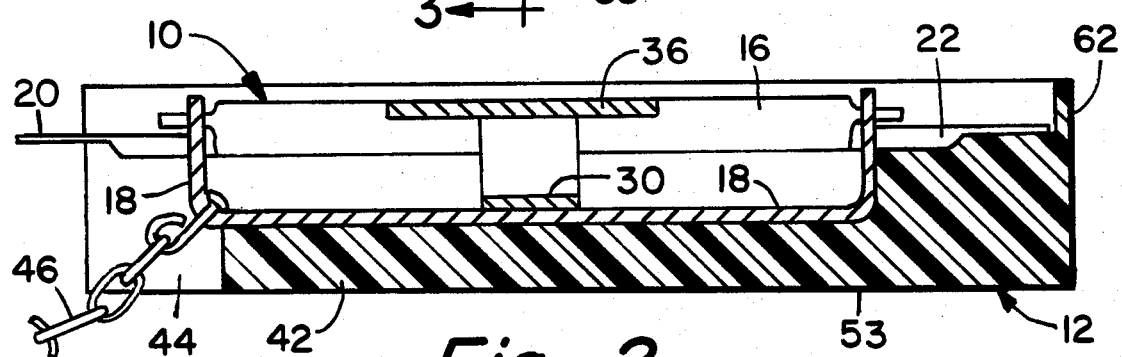
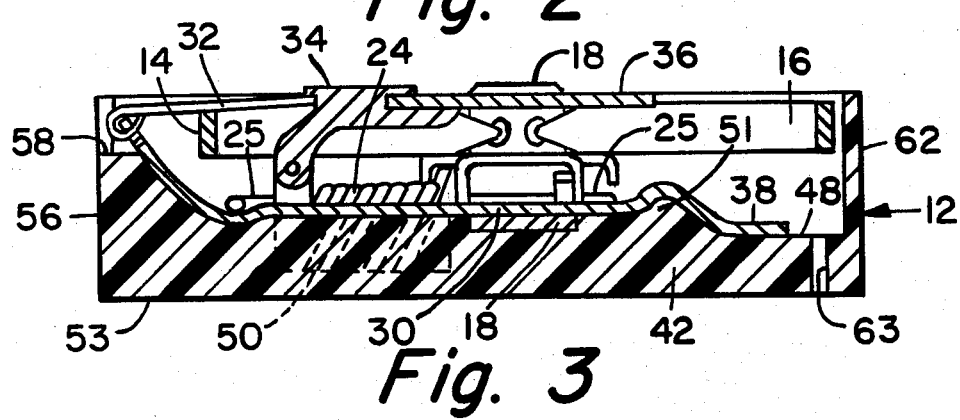

TRAP BOOT

BACKGROUND OF THE INVENTION

The present invention relates to steel traps, and more particularly, to accessories which facilitate the setting of such traps and also the efficient operation thereof. During the setting of traps, particularly those that are set on land, it is essential that the trap be bedded into the ground and that it be concealed so that the trap and surrounding area appear natural. When bedding a trap into the ground, a cavity or bed is prepared having such dimensions that the uppermost parts of a trap inserted therein are located about 0.25 inch beneath the surface of the soil. Thereafter, the trap is covered with dirt or kindred material.

Various adverse effects can occur because of the placement of the trap in the aforementioned trap bed cavity. After a trap has been placed in a cavity which has been prepared in the ground, soil is placed around the outside portions of the trap to prevent trap wobble. That is to say, the trap must have enough stability that it does not wobble when an animal steps on one of the open jaws. This packed soil can lead to certain disadvantages. It can prevent the jaws from closing at optimal speed. This situation becomes worsened when the trap is rained upon. The rain water turns the soil packed adjacent to the trap into a mud which can stick to trap parts, thereby causing the jaws to close much more slowly or not at all. The jaws can also stick to soil which has heaved or expanded during freezing weather.

After trap operation has been hindered by adverse conditions such as rain or freezing weather, the trap must be remade in order to again function properly. Any mud or soil which has collected on the trap must be removed. Even an experienced trapper requires a minute or two to repair the bed and again pack soil around the trap and cover it with natural material in order to conceal the trap. Each time it rains hard enough for trap operation to be impaired as explained above, the trap must be removed and cleaned, the cavity must be repaired, and the trap must again be bedded and concealed.

Even under good weather conditions, the placement of a trap into a bed or cavity in the ground can impair proper operation of the trap. During the closing of the trap jaws, the movement of various trap parts such as the springs and the spring levers has a tendency to lift the trap off the ground. Such upward movement of the trap is advantageous in that it can cause the jaws to engage a higher region of the animal's leg, and thus reduce the probability of the animal freeing itself. However, the upward springing of the trap is hindered by bedding it directly in the ground, with the result that there is little upward movement of a sprung trap, if any, when it is bedded in the ground.

Various animal traps, which have been designed specifically for recessed placement within the earth, are provided with an integral frame whereby the working parts of the trap do not come into contact with the earth. U.S. Pat. No. 1,889,351 teaches a trap, the working parts of which are located within a semi-spherical housing. A housing having such a shape is said to turn or pivot under the influence of a trapped animal, thus reducing the possibility of the animal inflicting injury upon itself. U.S. Pat. No. 2,506,834 teaches a trap having a rectangular frame which is open at its top and bottom. The trap housings of both of these patents are buried when set so that rain or freezing weather can cause the surrounding earth to adhere to the housing. If the housing adheres strongly enough to the earth, there is a possibility that the animal can use leverage from its three free legs to pull itself free. Also, if the trap housing is securely retained within the earth, the trap will lose the ability to spring upwardly when snapped. As mentioned previously, this can prevent the jaws from gripping a higher region of the animal's leg.

SUMMARY OF THE INVENTION

It is therefore an object of the present invention to provide an animal trap accessory which facilitates the setting of traps and the remaking of previously set traps that have become disturbed by rain. Another object is to provide a device which, when employed in conjunction with a conventional animal trap, enables the trap to spring upwardly a greater distance when snapped.

The accessory of the present invention is employed with a trap which conventionally comprises a frame, a pair of jaws rotatably mounted on the frame, a pan located between the jaws when the jaws are in the set position, and spring means on the frame to urge the jaws toward each other from their set position. Means are provided for pivotally mounting the pan on the frame. A dog pivotally mounted on the frame is adapted to contact the pan and hold the jaws in the set position.

The accessory of the present invention is a boot which comprises a floor of resilient material situated beneath substantially the entire trap. A relatively thin sidewall extends above the floor around at least a major portion of the periphery of the trap when the jaws are in the set position.

The upper surface of the floor of the boot preferably has a plurality of indentations for receiving the trap spring means, and the floor preferably conforms to the various trap parts such as the frame members, spring levers and the like. The sidewall can be formed as a unitary structure along with the floor, or it can be a separate structure which adheres to the resilient floor section, in which case the sidewall could be formed of either resilient or rigid material.

BRIEF DESCRIPTION OF THE DRAWINGS

FIG. 1 is a plan view of an animal trap situated within the boot of the present invention.

FIG. 2 is a cross-sectional view taken along lines 2—2 of FIG. 1.

FIG. 3 is a cross-sectional view taken along lines 3—3 of FIG. 1.

DESCRIPTION OF THE PREFERRED EMBODIMENT

FIGS. 1, 2 and 3 illustrate a conventional coiled spring trap 10 positioned within boot 12. The boot can also be employed with other types of traps such as underspring, single and double long-spring or the like. Trap 10 comprises a pair of jaws 14 and 16 which are rotatably mounted on frame 18. Pivotally mounted on frame 18 is a pair of spring levers 20 and 22 which are connected to the ends of coiled springs 24 and 26, respectively. The remaining ends of springs 24 and 26 bear against cross member 30, the center of which is affixed to frame 18. Each of the coiled springs 24 and 26 is disposed over a respective leg of U-shaped support member 25. The legs of U-shaped member 25 also function as support rods about which spring levers 20 and 22 pivot. Latch 32, which is pivotally connected to the end of cross member 30, is adapted to engage a notch in an arm 34 to which pan 36 is affixed. The end of cross member 30 opposite latch 32 terminates in a foot 38.

Trap boot 12 is formed of a resilient material such as neoprene, silicone rubber, or the like. Boot 12 has a relatively thick floor section 42 which may extend beneath the entire trap. Alternatively, it may extend beneath substantially all of the trap parts except at one or more regions such as slot 44 which may be provided to permit the passage of chain 46 through the boot. The upper surface 48 of floor section 42 is preferably shaped to fit the bottom surfaces of frame members 18 and 30, and it contains indentations 50 which receive springs 24 and 26. It may also be provided with a small mound 51 that conforms to the underside of foot 38. The bottom surface 53 may be substantially flat. The boot has outwardly projecting sections 52 and 54 into which spring levers 20 and 22 extend. The upper surface of the floor section in this region is thicker whereby it can be shaped to closely fit the under surfaces of the spring levers. A third outwardly projecting section 56 is provided to receive the end of cross member 30 opposite foot 38. A slot 58 is provided in section 56 to receive the end of latch 32. The fact that surface 48 conforms to various trap parts such as frame 18, cross member 30 and spring levers 20 and 22 and that it has indentations which receive the coiled springs enhances the stability of a trap that is set therein. This prevents the trap from wobbling when an animal steps on one side thereof.

The boot further comprises a relatively narrow vertical sidewall 62 which extend around the entire periphery of the trap including the open jaws. Alternatively, the sidewall may contain interruptions such as slots 44 and 58. The sidewall 62 and the floor 42 may be formed as a unitary structure, whereby the sidewall is also formed of resilient material. Alternatively, the sidewall can be formed of a more rigid material such as plastic which is bonded to floor 42. Sidewall 62 is preferably no thicker than about 0.125 inch and must have adequate thickness to resist the pressure of the surrounding ground material when the boot is installed in the surface of the earth. Sidewall 62 fits in close tolerance with the outer periphery of the spring levers and the open jaws. There is preferably less than 0.125 inch between the open jaws and the inner surface of sidewall 62 to prevent extraneous material from falling into and becoming wedged within that space. The sidewall preferably extends about 0.188 inch above the uppermost surface of the open jaws. A trapper merely prepares a hole and places the trap boot in the ground so that the top of sidewall 62 is about 0.06 inch from the surface of the ground. This locates the top surface of the open jaws the proper depth of about 0.25 inch below ground level. Soil is then packed around the boot to securely hold it in position. One or more holes 63 may be located in floor section 42. A nail can be passed through each hole and driven into the ground to assist in securing the boot in its proper position within the ground. Thus, a trapped animal is less likely to pull the boot from the ground and damage it by chewing it. When using the boot in regions that drain well, such as in sandy soil, one or more of the holes 63 may be utilized to drain rainwater from the boot. It is noted that water will also drain through slot 44.

The trap boot acts as a barrier between the trap and the surrounding soil. This protects the trap from such adverse conditions as freezing rain and mud, either of which would hamper operation of the trap.

The trap boot also anhances the ability of a trap to reach or jump upwardly when snapped. Perhaps this is due to the placement of resilient material beneath the coiled springs 24 and 26. It is known that a set trap placed on a flat, rigid surface will jump upwardly when snapped. It has been observed that when the same trap is disposed within a resilient trap boot, it will jump inches higher. This feature increases the probability that the closed jaws will engage a higher position on the animal's leg, thus decreasing the chance that the animal will escape.

The trap boot is also advantageous in that it simplifies the task of making repairs to the trap. For example, to replace a weak spring, the trap is merely removed from the boot, but the boot remains in the ground. The repaired trap or a replacement trap is easily inserted into the boot.

I claim:

1. A boot for use in combination with an animal trap having a frame, a pair of jaws rotatably mounted on said frame, a pan located between said jaws when said jaws are in the set position, spring means on said frame to urge said jaws toward eachother from a set position, means pivotally mounting said pan on said frame, and a dog adapted to contact said pan and hold said jaws in the set position, said boot comprising a floor of resilient material situated beneath substantially the entire animal trap, and a relatively thin sidewall connected to the periphery of said floor and extending above said floor around the major portion of the periphery of said trap including said jaws when said jaws are in the set position, there being no rigid connection between said boot and any part of said trap, whereby said trap is able to jump upwardly from said boot when snapped.

2. A boot in accordance with claim 1 wherein the upper surface of said floor has a plurality of indentations for receiving said spring means.

3. A boot in accordance with claim 2 wherein said trap includes spring levers that extend laterally beyond said jaws, and said boot comprises outwardly projecting sections, the floor portions of which underlie at least the major portions of said spring levers.

4. A boot in accordance with claim 3 wherein a section of said frame has a raised portion, and said floor has a mound that underlies said raised portion.

5. A boot in accordance with claim 3 wherein the inner surface of said sidewall is less than $\frac{1}{8}$ inch from said jaws when they are in the set position.

6. A boot in accordance with claim 3 wherein said sidewall and said floor are formed as a unitary structure.

7. A boot in accordance with claim 3 wherein a chain is connected to one end of said frame and said boot has a slot through which said chain passes.

* * * * *